United States Patent Office 3,511,370
Patented May 12, 1970

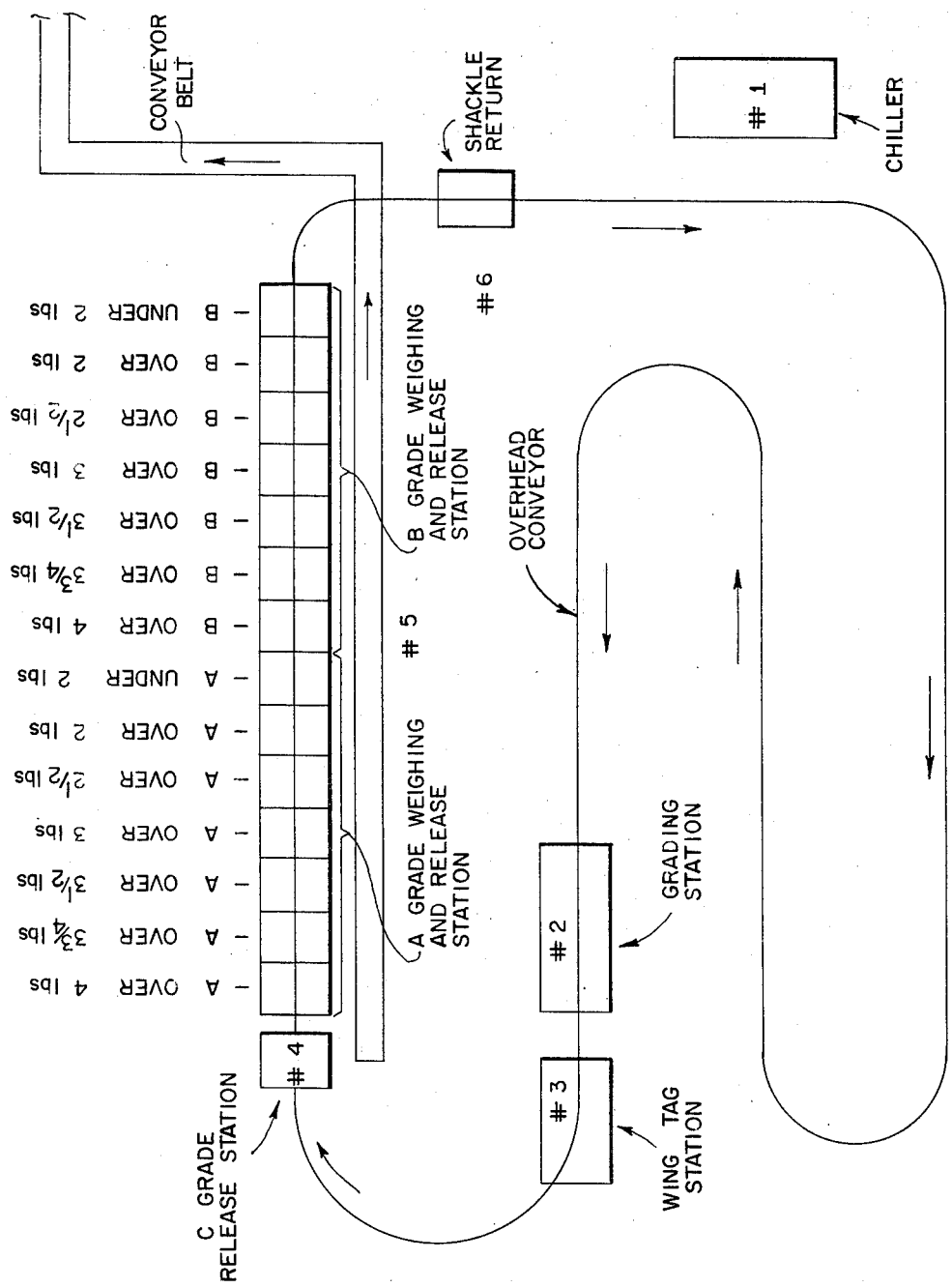

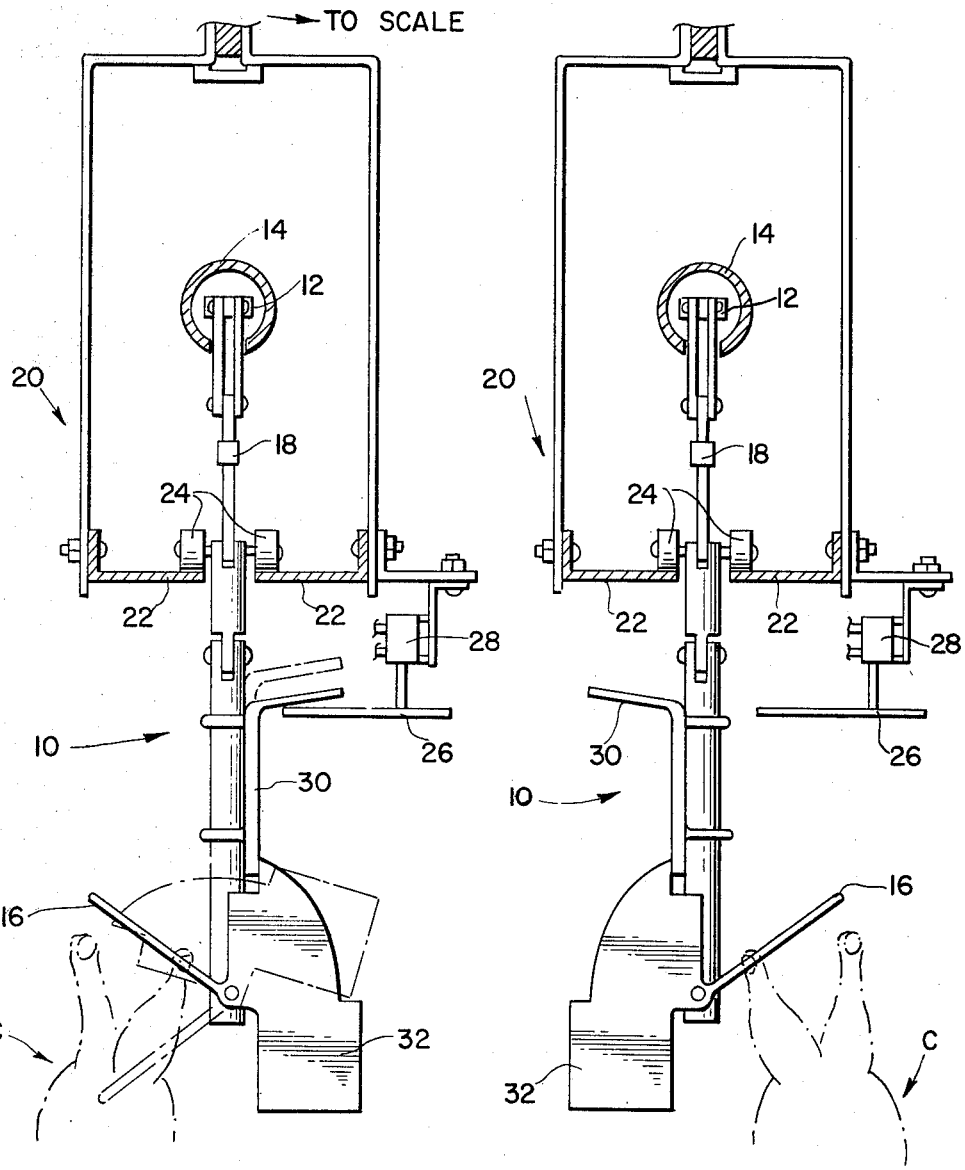

---

3,511,370
APPARATUS AND METHODS FOR SEGREGATING FOWL IN ACCORDANCE WITH QUALITY AND WEIGHT
Donald K. Taylor, 489 Hemlock Terrace,
Woodbury, N.J. 08096
Filed Apr. 28, 1969, Ser. No. 819,617
Int. Cl. B07c 5/24
U.S. Cl. 209—73                    7 Claims

ABSTRACT OF THE DISCLOSURE

Poultry carcasses are conveyed from a chiller by spaced carriers suspended from an overhead conveyor, the carriers being manually set to select the lateral position of the carcasses relative to the conveyor in accordance with a quality determination and the carcasses being weighed and released automatically at different locations in accordance with quality and weight categories.

---

A non-exclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to a novel system for facilitating the segregation of fowl into desired classification groups according to quality and weight and is more specifically concerned with improvements in poultry conveying and classifying systems employed in poultry processing plants.

In a widely known type of fowl processing plant, chickens, turkeys, ducks or other domesticated birds commonly used for food are killed, bled, defeathered, eviscerated, washed and are then chilled. Carcasses of mixed quality and weight are discharged from the chiller and are placed upon the carriers of an overhead conveyor. At a grading station specially trained personnel determine the quality of the birds as they pass by. Quality is determined by such factors as fleshing, fat covering, conformation and freedom from defects such as bruises, tears in skin, broken bones, etc., and may be in accordance with company or U.S.D.A. standards. Birds of other than grade A quality are manually removed from the conveyor and segregated into two or more quality classifications. Usually grade C quality birds (parts missing and trims) are placed directly into packing bins, because it is not required that fowl of such classification be segregated in accordance with weight. Birds of grade B quality are dropped onto a conveyor belt and conveyed to a second station, where they are manually placed upon a second overhead conveyor, later to be segregated in accordance with weight categories. Birds of grade A quality, which have been left on the first conveyor, may be identified by the attachment of a wing tag. The separate conveyors for A and B quality fowl are provided with weighing equipment which automatically releases fowl from the conveyor shackles into bins provided for the various weight classifications. The released fowl is placed in crates (a separate box for each quality and size classification) and the crates are placed on a conveyor belt and moved to a crate weighing scale for weighing and appropriate labeling. Crushed ice is added to the crates for refrigeration during distribution and the boxes are automatically closed and moved into a cooler to await shipment.

In the chilling operation the fowl is agitated in cold water. Some of the water absorbed during the chilling process must be drained off before packing of the fowl and weighing of the crated fowl. The amount of water released is determined by several factors. The more time that elapses between the moment that the fowl leaves the chiller and the moment that it reaches the crate weighing station, the more the loss of water (and hence weight). Also, the more the fowl is handled during this elapsed time, the greater the water loss. An accurate estimate of the amount of water retained by the fowl is important, because a tare for the retained water must be allowed when the crate is weighed. If more time is required for lower quality fowl to reach the crate weighing station, such fowl will have retained less water, and therefore, if the same tare is allowed as for higher quality fowl, the inaccuracy will represent a financial loss to the processor.

When a fowl is discharged from the chiller, its temperature is approximately 40 degrees F. or below. Ii is important that the fowl be packed and refrigerated as soon as possible, because its temperature will be affected by the temperature of the processing room, and the growth of bacteria will increase as the temperature of the fowl is increased. Moreover, any additional handling of the fowl increases its susceptibility to contamination. These factors reduce the shelf life. Therefore, the additional time and handling involved in shifting lower quality fowl to secondary conveyors is especially troublesome.

Most processing plants now stuff fowl with giblets as the fowl passes a giblet stuffing station prior to grading. If fowl of particular grade (e.g., B grade) is to be cut up, the giblets must be removed. This results in additional handling of the poultry, involving a double waste of effort, namely, that required to stuff and unstuff the giblets from the B quality fowl. Moreover, due to the additional handling and cost involved in segregating poultry by quality, many processing plants refuse to accept orders for graded fowl, and sell their product on a "line run" basis. Officially graded fowl is sold at a premium price.

BRIEF DESCRIPTION OF THE INVENTION

An important object of the present invention is to provide an improved system for segregating fowl into desired quality and weight classifications, which avoids the additional handling of special classifications that has plagued the prior art, which provides substantially identical transport time from chiller to discharge station for all classifications of fowl, so that the loss of water is uniform for all classifications, which reduces the susceptibility of the fowl to contamination, which reduces labor costs and improves classification efficiency, which provides processing flexibility, so that special orders may be filled without exorbitant cost, and which accomplishes all of the foregoing at minimal expense and with minimal space requirements.

Briefly stated, the system of the present invention utilizes an overhead conveyor having poultry-carrying shackles which are constructed to permit the shackles to be swivelled manually to different lateral positions relative to the conveyor. A trained grader determines the quality of the poultry and positions the shackles accordingly. Apparatus is provided at a weighing station to weigh the poultry positioned at opposite sides of the conveyor and to release the poultry of different grades and weights at different locations.

BRIEF DESCRIPTION OF THE DRAWINGS

The invention will be further described in conjunction with the accompanying drawings, which illustrate a preferred and exemplary embodiment, and wherein:

FIG. 1 is a diagrammatic plan view of a system in accordance with the invention;

FIGS. 2–4 are diagrammatic vertical sectional views illustrating the weighing and release of different grades and weights of poultry;

DETAILED DESCRIPTION OF THE INVENTION

Figure 4:
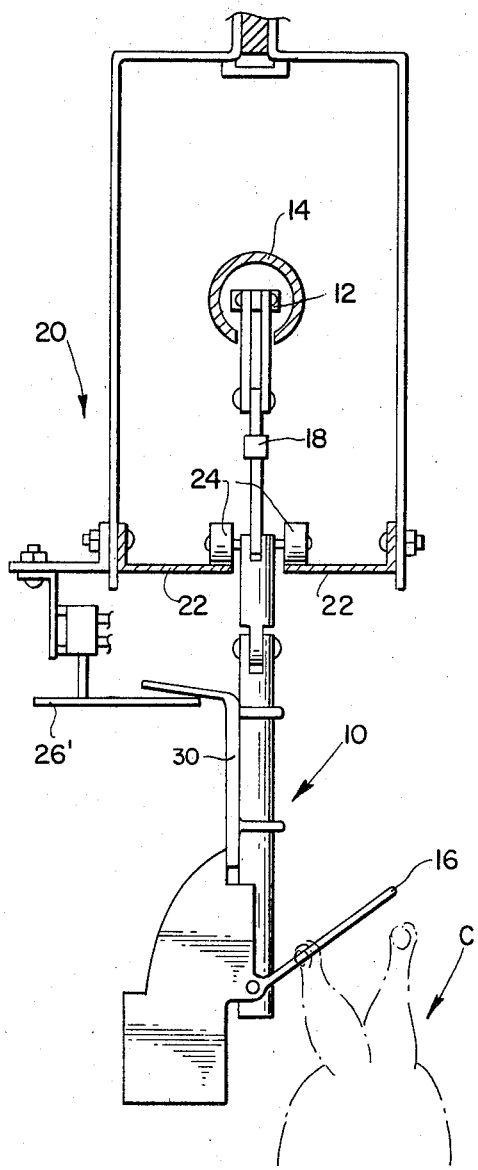

A system in accordance with the invention is illustrated diagrammatically in FIG. 1. Birds of mixed quality and weight from the chiller at station #1 are manually placed upon shackles of an overhead conveyor, passing by a grading station #2, where a determination is made by trained personnel as to the quality of the fowl. As will appear more fully hereinafter, the shackles are adjusted by the grader to position the birds laterally relative to the conveyor in accordance with their quality. Wing tags may be applied at station #3. The graded birds then pass to station #4, where grade C birds are released (automatically or manually) and placed in a suitable bin. As a rule, it is unnecessary to segregate grade C fowl in accordance with weight. Grade A and grade B birds remain upon the conveyor and proceed to station #5, where they are automatically weighed and released into different bins in accordance with their grade and weight classifications. The released birds are then placed in crates (a separate box for each quality and size classification), and the crates are moved by a conveyor belt to a crate weighing station for weighing and labeling. The empty shackles proceed to station #6, where the shackles are returned to a uniform lateral position automatically or manually.

It will be noted, that, in accordance with the invention, the various grades of fowl remain on the conveyor for about the same length of time. (The proportions illustrated are not to scale, the total length of the overhead conveyor being approximately 650 feet, for example, while the length of station #5 being approximately 42 feet, for example.) Thus the loss of water will be substantially the same for all grades of poultry. Since all grades of poultry move directly from the chiller to the packing bins, the opportunity for contamination is minimized. Since it is not necessary to remove birds manually from one conveyor and later to rehang such birds on another conveyor, there is a considerable saving of labor costs in comparison to the present systems. Since the quality determination can be made at any point after the fowl is discharged from the chiller, special treatment operations (such as giblet stuffing) may be carried out after quality determination, and with clear designation of the quality of the birds to be treated, so that unnecessary treatment of birds is eliminated.

It now remains to describe the apparatus which may be utilized in accomplishing the greatly improved results of the invention.

For conveying poultry in accordance with the invention any convenient overhead conveyor, such as a conveyor of the endless chain type, may be employed, but the conveyor must be provided with carriers which permit the carcasses to be placed in different predetermined lateral positions relative to the conveyor. The conveyor carriers or shackles may, for example, be of the general type referred to in Pat. No. 3,291,303 to Altenpohl, granted Dec. 13, 1966, or Pat. No. 3,017,027 to Brown et al., granted Jan. 16, 1962, but must be modified as will be set forth. The Altenpohl type is shown for illustrative purposes in FIGS. 2–4. The shackles 10 are suspended from the conveyor chain 12 at intervals, such as six inches, the chain being housed in a suitable tubular casing 14 and the shackles depending through a longitudinal slot at the bottom of the casing. The chain may be provided with the usual rollers to support its weight in the casing. The poultry carcasses are suspended from hooks or loops 16 provided adjacent to the bottom of the shackles, as shown at C.

In accordance with the invention, at a convenient position between the hooks 16 and the chain conveyor the shackles are provided with swivels 18 to permit the hook 16 and the carcass suspended therefrom to be shifted laterally to predetermined positions relative to the conveyor. Thus, in FIG. 2 the hook is shown at the left side of the conveyor 12, while in FIG. 3 the hook is shown at the right side of the conveyor. Through most of their travel the carcasses are supported only by the conveyor chain, but at the weighing station (#5), conventional weighing apparatus, including the frames 20 having plates 22 for supporting the shackles by means of shackle rollers 24, are provided. Thus, as is well known, the weight of the carcass is transmitted from the rollers 24 to the frame 20 and from the top of the frame to a scale, which may be adjusted to respond to a particular minimum weight of carcass and to ignore carcasses of lesser weight. When a carcass of the required weight passes the scale, a release lever 26 is actuated, as by a ram 28. If a latch bolt 30 associated with the shackle, is positioned at the same side of the conveyor as lever 26, the bolt will be lifted and will release the plate 32, so that the carcass hook turns by gravity to the phantom line position shown in FIG. 2 to release the carcass to a bin waiting below.

It will be noted in FIG. 2 that the latch bolt 30 is at the same side of the conveyor 12 as the release lever 26 so that it is capable of being engaged thereby, while in FIG. 3, the latch bolt 30 is at the opposite side and is incapable of being engaged by the release lever 26. Hence, even if the carcass of FIG. 3 is of the proper weight to actuate the release lever 26, the carcass will not be released from the conveyor. In FIG. 4, on the other hand, the latch bolt can be engaged by another release lever, 26', which is at the left side of the conveyor and hence capable of engaging the bolt. In accordance with the invention duplicate scales are provided for each weight category (as shown in FIG. 1 at station #5), the scales for grade A having their release lever at one side of the conveyor and the scales for grade B having their release lever at the opposite side of the conveyor. Thus, while grade A birds may affect grade B scales, and vice versa, the birds will only be released into the proper bins according to quality. The scales may be arranged with grade A and grade B grouped as shown in FIG. 1, or grade A and grade B scales of the same weight category may follow each other, so that the grade A and grade B scales alternate. Further details of typical weighing and release apparatus may be found in the aforesaid Altenpohl patent. Other types of weighing and release apparatus which may be employed in the system of the invention are disclosed in the aforesaid Brown et al. patent and elsewhere in the prior art. In all instances, however, it is essential that the apparatus be constructed in accordance with the invention so that the release apparatus is actuated only when a key element of a shackle is positioned at the appropriate side of the conveyor.

Figure 5:
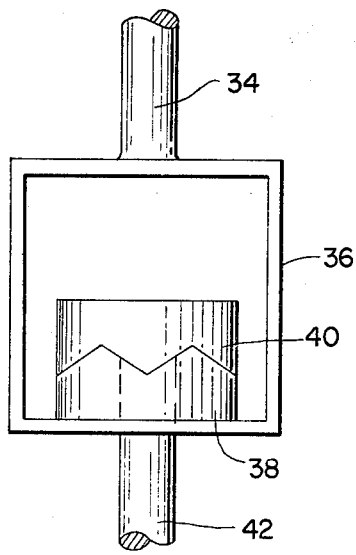
FIG. 5 is a fragmentary elevation view of a typical shackle swivel.
Figure 6:
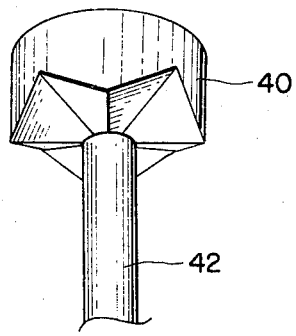
FIG. 6 is a fragmentary perspective view illustrating a portion of the shackle.

FIGS. 5 and 6 illustrate a typical shackle swivel which may be employed in the invention. As shown, the upper portion of the shackle may comprise a rod 34 having a cage 36 attached thereto, the cage supporting a fixed cam block 38 cooperating with a cam follower block 40 attached to the top of a lower shaft 42, which is free to turn in a bore through the bottom of cage 36 and cam block 38. The periphery of the cams is complementarily serrated so that turning of the lower shaft 42 will cause the lower shaft and the cam 40 to rise and then to drop again when the cam reaches the next position.

The swivel may be constructed to provide positive positioning at 90 degree intervals as shown in FIGS. 5 and 6, or merely at 180 degrees intervals (opposite sides of the conveyor). In the former case grade C fowl may be positioned with the carcass in line with the conveyor, while grades A and B fowl may be positioned at opposite sides of the conveyor. (A suitable stop may be provided to prevent 360 degree rotation of the swivel.) In the latter case grade C fowl may be sent to station #4 by separate conveyor, and grades A and B fowl may be positioned at opposite sides of the conveyor. The release of grade C fowl at station #4 (when the swivel has three positions) may be accomplished automatically by a mechanism which senses "in-line" latch bolts 30 or may be done manually. The shackles may all be turned to a prescribed position at station #6 by an automatic latch bolt aligning device, or this may be done manually. If the swivels 18 have an "in-line" position for C grade birds and are located above wheels 24, the C grade shackles should be "returned" at station #4, so that the wheels will roll upon scale plates 22. With two-position swivels, or with swivels located below the wheels, all shackles may be returned at station #6.

An important attribute of the invention is that a greatly improved system can be provided with minimal capital investment and minimal space requirements. The cost of the shackle swivels is low, and the cost of a second conveyor for B grade fowl is eliminated. Scales which would normally be used in conjunction with the B grade conveyor are instead used with the single conveyor of the invention.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Conveying and sorting apparatus comprising an elongated conveyor having a plurality of article carriers spaced thereon for carrying articles to be separated in accordance with quality and weight categories, a plurality of sets of weighing means, each set having means for initiating release of articles carried by said carriers at different locations depending upon the weight categories of the articles, and means associated with each of said carriers and adapted to be placed in different positions relative to said conveyor depending upon the quality of the articles carried by the associated carriers for rendering a selected set of said weighing means effective to initiate said release of said articles depending upon the said positions, whereby articles released from said conveyor at different locations are separated in accordance with quality and weight categories.

2. Apparatus in accordance with claim 1, wherein said conveyor is an overhead endless conveyor and said carriers are suspended from said conveyor, and wherein said means adapted to be placed in different positions relative to said conveyor comprises swivel means for permitting carrier parts to be turned laterally relative to said conveyor to place said parts in said different positions.

3. Conveying and sorting apparatus comprising an elongated conveyor having a plurality of article carriers spaced thereon, each of said article carriers having means permitting at least a part of the carrier to be placed in different predetermined positions with respect to the conveyor, means for automatically releasing articles from said carriers at different locations depending upon the position of the associated parts, and means for weighing articles carried by said carriers and for selectively actuating said releasing means in accordance with article weight and the position of said carrier parts, said weighing means comprising a plurality of scales responsive to different weight categories, there being a pair of scales for each category, one scale for each category having means for initiating the release of articles whose carrier parts are in one of said positions and the other scale for each category having means for initiating the release of articles whose carrier parts are in another of said positions.

4. Conveying and sorting apparatus comprising an elongated conveyor having a plurality of article carriers spaced thereon, each of said article carriers having means permitting at least a part of the carrier to be placed in different predetermined positions with respect to the conveyor, means for automatically releasing articles from said carriers at different locations depending upon the position of the associated parts, and means for weighing articles carried by said carriers and for selectively actuating said releasing means in accordance with article weight and the position of said carrier parts, said means for releasing said articles from said carriers comprising elements associated with said carriers and movable to different lateral positions in accordance with the position of said carrier parts, and cooperating elements at opposite sides of said conveyor.

5. Conveying and sorting apparatus comprising an elongated conveyor having a plurality of article carriers spaced thereon, each of said article carriers having means permitting at least a part of the carrier to be placed in different predetermined positions with respect to the conveyor, means for automatically releasing articles from said carriers at different locations depending upon the position of the associated parts, and means for weighing articles carried by said carriers and for selectively actuating said releasing means in accordance with article weight and the position of said carrier parts, said weighing means comprising a plurality of scales arranged in sequence and responsive to different weight categories, there being a pair of scales for each category, one scale of each pair having a weight-responsive element of said article release means disposed at one side of said conveyor and the other scale of each pair having a weight-responsive element of said release means disposed at the opposite side of said conveyor, each of said carriers having an element of said release means movable to the sides of said conveyor in accordance with the position of the associated carrier part and being adapted to cooperate with the first-mentioned elements when at the same side of said conveyor as the first-mentioned elements.

6. A method of segregating poultry carcasses and the like in accordance with quality and weight, which comprises, conveying poultry carcasses of at least two different qualities and of a plurality of different weight categories along a conveyor by means of carriers thereon, positioning at least part of certain carriers relative to the conveyor in accordance with the quality of the associated carcasses, weighing the said carcasses, and releasing the carcasses from said carriers in accordance with their weight category and the position of said carrier parts.

7. A method in accordance with claim 6, wherein said conveyor is an overhead conveyor and the carcasses are suspended from said conveyor by swivellable carrier parts, and wherein the positioning of said carrier parts relative to said conveyor comprises turning said carrier parts about a substantially vertical axis.

References Cited

UNITED STATES PATENTS

| 2,994,430 | 8/1961 | Reck et al. | 209—121 |
| 3,023,878 | 3/1962 | Forsthoff et al. | 198—38 |
| 3,055,480 | 9/1962 | Hyman | 198—38 |
| 3,282,400 | 11/1966 | Jönson | 198—38 |

FOREIGN PATENTS

| 873,426 | 7/1961 | Great Britain. |
| 1,086,063 | 10/1967 | Great Britain. |

ALLEN N. KNOWLES, Primary Examiner

U.S. Cl. X.R.

209—74, 75, 90, 121; 198—38